(12) United States Patent
Franklin et al.

(10) Patent No.: US 7,865,054 B2
(45) Date of Patent: Jan. 4, 2011

(54) APPARATUS AND METHOD FOR HANDLING AN OPTICAL SIGNAL

(75) Inventors: James D. Franklin, Manhattan Beach, CA (US); Luis Kil, Torrance, CA (US)

(73) Assignee: The Boeing Company, Chicago, IL (US)

(*) Notice: Subject to any disclaimer, the term of this patent is extended or adjusted under 35 U.S.C. 154(b) by 211 days.

(21) Appl. No.: 12/177,304

(22) Filed: Jul. 22, 2008

(65) Prior Publication Data

US 2010/0021184 A1 Jan. 28, 2010

(51) Int. Cl.
*G02B 6/00* (2006.01)
(52) U.S. Cl. ........................ 385/140; 385/147
(58) Field of Classification Search .......... 385/95, 385/140, 147, 139; 359/288; 398/29, 193, 398/81, 92
See application file for complete search history.

(56) References Cited

U.S. PATENT DOCUMENTS

| | | | | |
|---|---|---|---|---|
| 4,639,077 | A * | 1/1987 | Dobler | 385/92 |
| 5,309,542 | A * | 5/1994 | Strope et al. | 385/140 |
| 6,466,728 | B1 | 10/2002 | Radloff et al. | |
| 6,856,752 | B2 * | 2/2005 | Bischel et al. | 385/140 |
| 6,870,998 | B2 * | 3/2005 | Diemeer et al. | 385/140 |
| 2002/0146231 | A1 | 10/2002 | Johnson et al. | |
| 2003/0044111 | A1 * | 3/2003 | Oberland | 385/24 |
| 2003/0138234 | A1 | 7/2003 | Yong | |
| 2005/0196093 | A1 | 9/2005 | Grossman et al. | |
| 2006/0050751 | A1 * | 3/2006 | Sakamoto | 372/32 |
| 2009/0269055 | A1 * | 10/2009 | Butler et al. | 398/27 |

OTHER PUBLICATIONS

Great Britian Intellectual Property Office, Combined Search and Examination Report of Oct. 20, 2009 re: Application GB0912502.2.
"Transformational Communications Architecture (TCA)"; GlobalSecurity.org; http://www.globalsecurity.org/space/systems/tca.htm; last modified Jan. 9, 2005.
"Transformational SATCOM (TSAT) Transformational Communcations Satellite (TSAT) Advanced Wideband System"; GlobalSecurity.org; http://www.globalsecurity.org/space/systems/tsat.htm; last modified Jan. 9, 2005.
"Transformational Satellite Communications System Space Segment (TSAT SS) Backgounder"; Boeing Company, IDS Business Support, Communications and Community Affairs, PO Box 516, St. Louis, MO 63166; last updated May 15, 2007.

* cited by examiner

*Primary Examiner*—Akm E Ullah
(74) *Attorney, Agent, or Firm*—Law Office of Donald D. Mondul

(57) ABSTRACT

An apparatus for handling an optical signal includes: an optical transmitting unit transmitting the optical signal from an input locus to an output locus. The optical transmitting unit includes a plurality of optical transmitting sections. Each respective optical transmitting section of the plurality of optical transmitting sections has a respective length and a respective attenuation gradient to establish a respective length-and-attenuation gradient configuration. Each respective optical transmitting section effects attenuation of the optical signal according to its respective length-and-attenuation gradient configuration.

24 Claims, 3 Drawing Sheets

APPARATUS AND METHOD FOR HANDLING AN OPTICAL SIGNAL

The invention was made with Government support under Contract Number FA8808-04-C-0022 awarded by the Air Force. The Government has certain rights in this invention.

FIELD

The present disclosure may be directed to optical signal handling such as, by way of example and not by way of limitation, optical communications signal handling. The present disclosure may be especially directed to high power optical communication systems such as, by way of further example and not by way of limitation, the Transformational Satellite (TSAT) Communication System, an advanced wideband communication system.

BACKGROUND

There may be some circumstances under which one may wish to reduce high power transmitted or otherwise traversing an optical transmitting unit such as, by way of example and not by way of limitation, an optical fiber. Instances in which one may wish to reduce high power in an optical system may include, by way of example and not by way of limitation, to provide lower power levels for evaluation or experimental purposes or to employ a two-by-two optical switch for only one output.

One approach to reducing power from an optical fiber may be to pass the optical power across an interface with the fiber into free space or another medium so that power may be dissipated in free space or in another medium than the optical fiber. A problem with this first approach may be encountered in the form of contamination at the interface between the fiber and free space or other medium. Contamination may damage the interface surface and adversely affect transmission of optical signals.

Another approach to reducing power from an optical fiber may be to absorb power in the fiber and dissipate the absorbed power as heat in the fiber. This second approach may be a preferred approach to power dissipation of optical signals in optical transmitting units such as optical fibers. In high power optical signal handling systems one may be required to employ lengths of power dissipating structure that may counter design criteria such as a desire to construct a compact system.

There is a need for an efficient and space-saving system and method for handling an optical signal to reduce power in the signal as the signal traverses an optical transmitting unit such as an optical fiber.

SUMMARY

An apparatus for handling an optical signal includes: an optical transmitting unit transmitting the optical signal from an input locus to an output locus. The optical transmitting unit includes a plurality of optical transmitting sections. Each respective optical transmitting section of the plurality of optical transmitting sections has a respective length and a respective attenuation gradient to establish a respective length-and-attenuation gradient configuration. Each respective optical transmitting section effects attenuation of the optical signal according to its respective length-and-attenuation gradient configuration.

A method for handling an optical signal includes: (a) providing an optical transmitting unit transmitting the optical signal from an input locus to an output locus; the optical transmitting unit including a plurality of optical transmitting sections; each respective optical transmitting section of the plurality of optical transmitting sections having a respective length and a respective attenuation gradient to establish a respective length-and-attenuation gradient configuration; each respective optical transmitting section effecting attenuation of the optical signal according to a respective length-and-attenuation gradient configuration; and (b) arranging the respective length-and-attenuation gradient configurations to effect greater signal attenuation proximate to the output locus than is effected proximate to the input locus.

It is, therefore, a feature of the present disclosure to present an efficient and space-saving system and method for handling an optical signal to reduce power in the signal as the signal traverses an optical transmitting unit such as an optical fiber.

Further features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

The high power fiber system and method disclosed herein may be employed advantageously as a signal attenuation component or a signal termination component in an optical signal handling system. The disclosed system and method may employ a single mode or multimode fiber that is cascaded in a stepped manner to reduce the overall length of the fiber to manageable levels.

Figure 1:
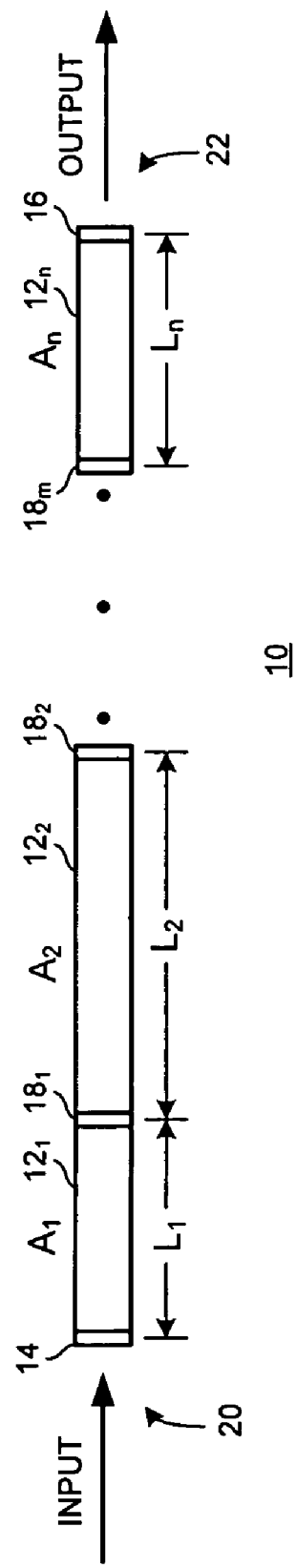
FIG. 1 is a schematic illustration of the apparatus of the disclosure.

FIG. 1 is a schematic illustration of the apparatus of the disclosure. The structure illustrated in FIG. 1 may treat optical power in an optical fiber structure to spread absorption of the power of optical signals traversing the optical fiber structure throughout the optical fiber structure in a controlled and efficient manner. In FIG. 1, an optical fiber apparatus 10 may be configured by splicing or otherwise coupling a plurality of lengths of optical fiber segments $12_1$, $12_2$, $12_n$ together to present optical fiber apparatus 10 as a substantially unitary structure. The indicator "n" is employed to signify that there can be any number of optical fiber segments in optical fiber apparatus 10. The inclusion of three optical fiber segments $12_1$, $12_2$, $12_n$ in FIG. 1 is illustrative only and does not constitute any limitation regarding the number of optical fiber segments that may be included in the optical fiber apparatus of the present disclosure.

Optical fiber apparatus 10 may present each respective optical fiber segment $12_1$, $12_2$, $12_n$ configured with a different attenuation gradient $A_1$, $A_2$, $A_n$, and each respective optical fiber segment $12_1$, $12_2$, $12_n$ may present a respective length $L_1$, $L_2$, $L_n$. An input interface structure 14 may be provided for effecting reception of input optical signals at an input locus 20. An output interface structure 16 may be provided for effecting transmission of output optical signals at an input locus 22 for use by other components (not shown in FIG. 1; understood by those skilled in the art of optical communication systems).

Splicing structures $18_1$, $18_2$, $18m$ may be employed to effect optical and physical coupling between adjacent paired optical fiber segments. In such a structure, splicing structure $18_1$ may effect optical and physical coupling between optical fiber segments $12_1$, $12_2$. Splicing structure $18_2$ may effect optical and physical coupling between optical fiber segments $12_2$, $12_3$ (not shown in FIG. 1). Splicing structure $18_m$ may effect optical and physical coupling between optical fiber segments $12_{n-1}$ (not shown in FIG. 1), $12_n$. The indicator "m" is employed to signify that there can be any number of splicing structures in optical fiber apparatus 10. The inclusion of three splicing structures $18_1$, $18_2$, $18_m$ in FIG. 1 is illustrative only and does not constitute any limitation regarding the number of splicing structures that may be included in the optical fiber apparatus of the present disclosure. One may observe that indicator "m" may often be related with indicator "n" by the expression: m=n−1. Input interface structure 14, output interface structure 16 and splicing structures $18_m$ may each effect attenuation of signals traversing optical fiber apparatus 10.

Optical fiber apparatus 10 may be configured to present respective optical fiber segments $12_1$, $12_2$, $12_n$, with respective attenuation gradients $A_1$, $A_2$, $A_n$, and respective lengths $L_1$, $L_2$, $L_n$ arranged to establish a respective length-and-attenuation gradient configuration for each respective optical fiber structure $12_n$. Optical fiber apparatus 10 may be assembled or configured to present respective length-and-attenuation gradient configurations for respective optical fiber segments $12_n$ to effect greater signal attenuation proximate to output locus 22 than is effected proximate to input locus 20.

Optical fiber apparatus 10 may be assembled or configured to present respective length-and-attenuation gradient configurations for respective optical fiber segments $12_n$ to effect increasingly greater signal attenuation as distance from input locus toward output locus 22 increases.

Optical fiber apparatus 10 may be assembled or configured with each respective optical fiber segment $12_n$ having an equal length $L_n$ but having differing attenuation gradients $A_n$ to effect greater signal attenuation proximate to output locus 22 than is effected proximate to input locus 20.

Optical fiber apparatus 10 may be assembled or configured with a plurality of length-and-gradient configurations arranged appropriately to substantially completely attenuate or terminate a signal traversing apparatus 10. Respective length-and-gradient configurations in such a signal terminating apparatus 10 will advantageously distribute heat dissipation generated by termination of the signal along the length of apparatus 10.

Optical fiber apparatus 10 may be assembled or configured with each respective optical fiber segment $12_n$ having an equal length $L_n$ but having differing attenuation gradients $A_n$ to effect increasingly greater signal attenuation as distance from input locus toward output locus 22 increases.

Optical fiber apparatus 10 may be thermally coupled with a heat dissipating structure to aid in dissipating heat energy from optical fiber apparatus 10.

Figure 2:
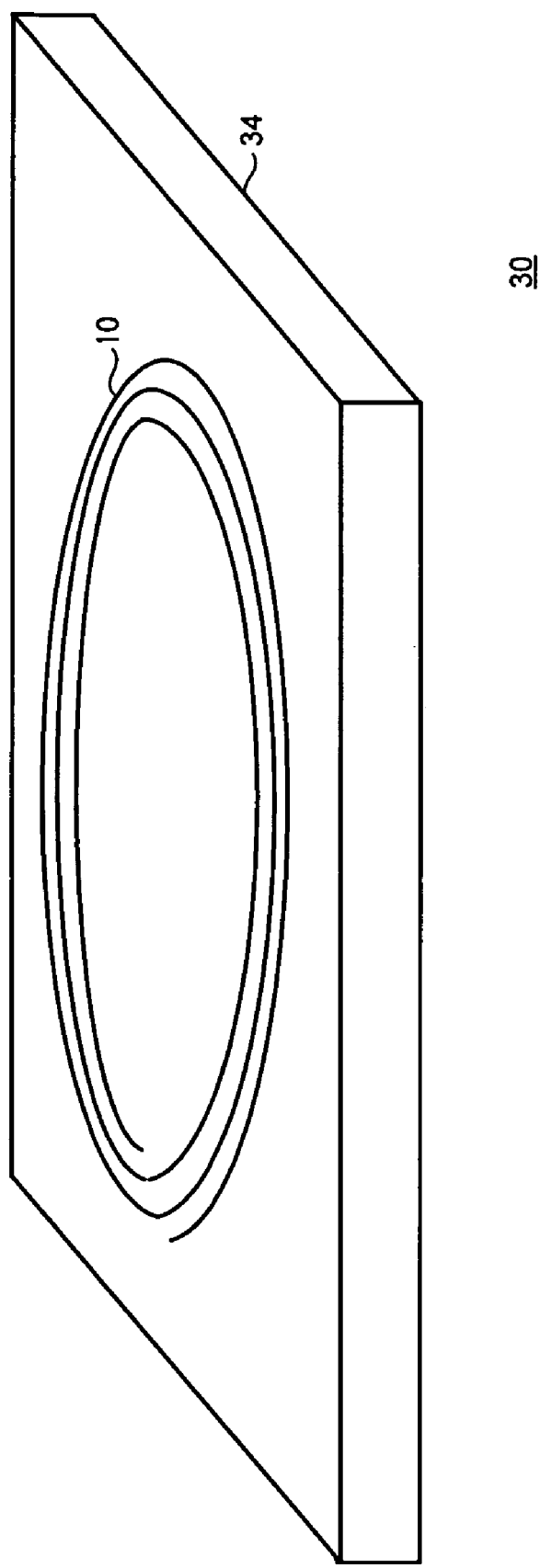
FIG. 2 is an illustration of the apparatus of the disclosure employed with a heat dissipating structure.

FIG. 2 is an illustration of the apparatus of the disclosure employed with a heat dissipating structure. In FIG. 2, a heat dissipating structure 30 may include an optical fiber apparatus 10 constructed generally as described in connection with FIG. 1 coiled in a generally spiral orientation and mounted upon a heat dissipating structure 34. Mounting may be effected using thermally conductive adhesive, laminating or another mounting technology. Winding fiber apparatus 10 upon heat dissipating structure 34 in a generally spiral orientation or pattern may also reduce stress on fiber apparatus 10 resulting from thermal effects. Thermal contact between fiber apparatus 10 and heat dissipating structure 34 may be important; a spiral-on-a-plate structure, as illustrated in FIG. 2, may provide a direct thermal path and may permit winding fiber apparatus 10 to no less than a minimum radius so as to minimize stress in fiber apparatus 10.

Figure 3:
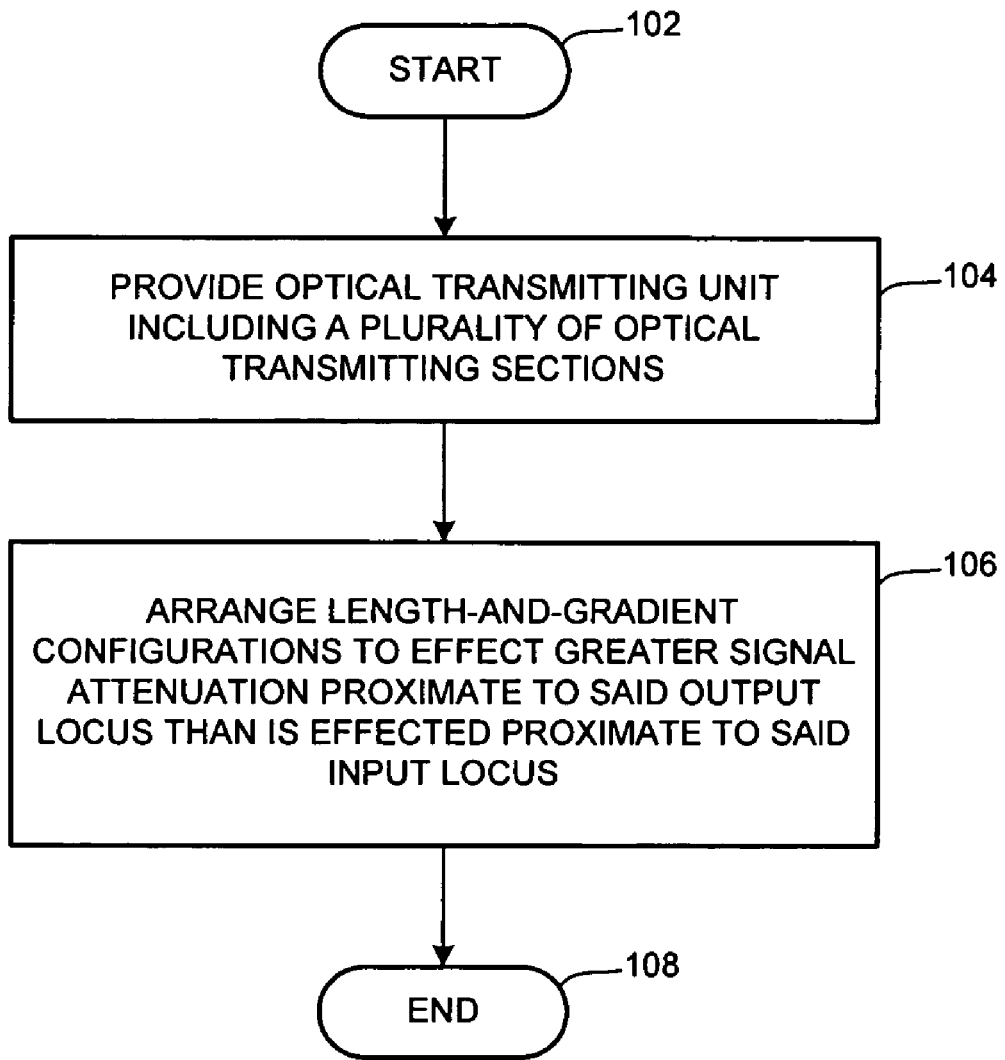
FIG. 3 is a flow diagram illustrating the method of the disclosure.

FIG. 3 is a flow diagram illustrating the method of the disclosure. In FIG. 3, a method 100 for handling an optical signal may begin at a START locus 102. Method 100 may continue by providing an optical transmitting unit transmitting the optical signal from an input locus to an output locus, as indicated by a block 104. The optical transmitting unit may include a plurality of optical transmitting sections. Each respective optical transmitting section of the plurality of optical transmitting sections may have a respective length and a respective attenuation gradient to establish a respective length-and-attenuation gradient configuration. Each respective optical transmitting section may effect attenuation of the optical signal according to a respective length-and-attenuation gradient configuration.

Method 100 may continue with arranging the respective length-and-attenuation gradient configurations to effect greater signal attenuation proximate to the output locus than is effected proximate to the input locus, as indicated by a block 106. Method 100 may terminate at an END locus 108

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. An apparatus for attenuating an optical signal; the apparatus comprising: a plurality of optical transmitting units coupled for transmitting said optical signal substantially along a single optical path from an input locus to an output locus; each respective optical transmitting unit of said plurality of optical transmitting units having a respective attenuation gradient; and said respective optical transmitting units having a greater attenuation gradient being generally situated distal from said input locus than said respective optical transmitting units having a lesser attenuation gradient.

2. An apparatus for attenuating an optical signal as recited in claim 1 wherein said plurality of optical transmitting units is coupled in order of increasing respective attenuation gradients from said input locus to said output locus.

3. An apparatus for attenuating an optical signal as recited in claim 1 wherein at least one optical transmitting unit of said plurality of optical transmitting units is thermally coupled with a heat dissipating structure.

4. An apparatus for attenuating an optical signal as recited in claim 1 wherein said plurality of optical transmitting units is a plurality of fiber optic segments, and wherein said input locus is an input interface unit coupled with a first said fiber optic segment of said plurality of fiber optic segments and said output locus is an output interface unit coupled with a last said fiber optic segment of said plurality of fiber optic segments; said last fiber optic segment being situated most distal from said input locus.

5. An apparatus for attenuating an optical signal as recited in claim 3 wherein said plurality of fiber optic segments is optically coupled by splicing structures; each said splicing structure effecting attenuation of signals traversing said splicing structure.

6. An apparatus for attenuating an optical signal as recited in claim 2 wherein at least one optical transmitting unit of said plurality of optical transmitting units is thermally coupled with a heat dissipating structure.

7. An apparatus for attenuating an optical signal as recited in claim 2 wherein at least one optical transmitting unit of said plurality of optical transmitting units is thermally coupled with a heat dissipating structure in a generally spiral pattern.

8. An apparatus for attenuating an optical signal as recited in claim 2 wherein said plurality of optical transmitting units is a plurality of fiber optic segments, and wherein said input locus is an input interface unit coupled with a first said fiber optic segment of said plurality of fiber optic segments and said output locus is an output interface unit coupled with a last said fiber optic segment of said plurality of fiber optic segments; said last fiber optic segment being situated most distal from said input locus.

9. An apparatus for attenuating an optical signal as recited in claim 8 wherein said plurality of fiber optic segments is optically coupled by splicing structures; each said splicing structure effecting attenuation of signals traversing said splicing structure.

10. An apparatus for handling an optical signal; the apparatus comprising: an optical transmitting unit transmitting said optical signal substantially along a single optical path from an input locus to an output locus; said optical transmitting unit including a plurality of optical transmitting sections coupled to establish a substantially unitary optical transmitting structure; each respective optical transmitting section of said plurality of optical transmitting sections having a respective length and a respective attenuation gradient to establish a respective length-and-attenuation gradient configuration; and each said respective optical transmitting section effecting attenuation of said optical signal according to a respective length-and-attenuation gradient configuration.

11. An apparatus for handling an optical signal as recited in claim 10 wherein said respective length-and-attenuation gradient configurations are arranged to effect greater signal attenuation proximate to said output locus than is effected proximate to said input locus.

12. An apparatus for handling an optical signal as recited in claim 10 wherein said respective optical transmitting sections are arranged according to respective length-and-attenuation gradient configurations to effect increasingly greater signal attenuation as distance from said input locus increases.

13. An apparatus for handling an optical signal as recited in claim 10 wherein at least one optical transmitting section of said plurality of optical transmitting sections is thermally coupled with a heat dissipating structure.

14. An apparatus for handling an optical signal as recited in claim 10 wherein said plurality of optical transmitting sections is configured as a plurality of fiber optic segments; each adjacent pair of fiber optic segments of said plurality of fiber optic segments being spliced together at a respective splicing interface; each said respective splicing interface effecting attenuation of signals traversing said splicing interface.

15. An apparatus for handling an optical signal as recited in claim 11 wherein at least one optical transmitting section of said plurality of optical transmitting sections is thermally coupled with a heat dissipating structure.

16. An apparatus for handling an optical signal as recited in claim 11 wherein at least one optical transmitting section of said plurality of optical transmitting sections is thermally coupled with a heat dissipating structure in a generally spiral pattern.

17. An apparatus for handling an optical signal as recited in claim 12 wherein at least one optical transmitting section of said plurality of optical transmitting sections is thermally coupled with a heat dissipating structure.

18. An apparatus for handling an optical signal as recited in claim 15 wherein said plurality of optical transmitting sections is configured as a plurality of fiber optic segments; each adjacent pair of fiber optic segments of said plurality of fiber optic segments being spliced together at a respective splicing interface; each said respective splicing interface effecting attenuation of signals traversing said splicing interface.

19. An apparatus for handling an optical signal as recited in claim 17 wherein said plurality of optical transmitting sections is configured as a plurality of fiber optic segments; each adjacent pair of fiber optic segments of said plurality of fiber optic segments being spliced together at a respective splicing interface; each said respective splicing interface effecting attenuation of signals traversing said splicing interface.

20. A method for handling an optical signal; the method comprising:
(a) providing an optical transmitting unit transmitting said optical signal substantially along a single optical path from an input locus to an output locus; said optical transmitting unit including a plurality of optical transmitting sections; each respective optical transmitting section of said plurality of optical transmitting sections having a respective length and a respective attenuation gradient to establish a respective length-and-attenuation gradient configuration; each said respective optical transmitting section effecting attenuation of said optical signal according to a respective length-and-attenuation gradient configuration; and
(b) coupling said plurality optical transmitting sections to arrange said respective length-and-attenuation gradient configurations to effect greater signal attenuation proximate to said output locus than is effected proximate to said input locus.

21. A method for handling an optical signal as recited in claim 20 wherein said respective optical transmitting sections are arranged according to respective length-and-attenuation gradient configurations to effect increasingly greater signal attenuation as distance from said input locus increases.

22. A method for handling an optical signal as recited in claim 21 wherein at least one optical transmitting section of said plurality of optical transmitting sections is thermally coupled with a heat dissipating structure.

23. An apparatus for handling an optical signal; the apparatus comprising: an optical transmitting unit transmitting said optical signal substantially along a single optical path from an input locus to an output locus; said optical transmitting unit including a plurality of optical transmitting sections coupled to establish a substantially unitary optical transmitting structure; each respective optical transmitting section of said plurality of optical transmitting sections having a respective length and a respective attenuation gradient to establish a respective length-and-attenuation gradient configuration; each said respective optical transmitting section effecting attenuation of said optical signal according to a respective length-and-attenuation gradient configuration; and said respective optical transmitting sections being arranged according to respective length-and-attenuation gradient configurations to effect increasingly greater signal attenuation as distance from said input locus increases.

24. A method for handling an optical signal; the method comprising:
(a) providing an optical transmitting unit transmitting said optical signal substantially along a single optical path from an input locus to an output locus; said optical transmitting unit including a plurality of optical transmitting sections; each respective optical transmitting section of said plurality of optical transmitting sections having a respective length and a respective attenuation gradient to establish a respective length-and-attenuation gradient configuration; each said respective optical transmitting section effecting attenuation of said optical signal according to a respective length-and-attenuation gradient configuration; and (b) coupling said plurality optical transmitting sections to arrange said respective length-and-attenuation gradient configurations to effect greater signal attenuation proximate to said output locus than is effected proximate to said input locus; said respective optical transmitting sections being arranged according to respective length-and-attenuation gradient configurations to effect increasingly greater signal attenuation as distance from said input locus increases.

* * * * *